United States Patent [19]

Stricklen

[11] Patent Number: 5,003,150
[45] Date of Patent: Mar. 26, 1991

[54] APPARATUS FOR INERT GAS SHIELDED ARC WELDING

[75] Inventor: Gary A. Stricklen, Burlingame, Calif.

[73] Assignee: United Air Lines, Inc., Elk Grove Township, Ill.

[21] Appl. No.: 482,785

[22] Filed: Feb. 21, 1990

[51] Int. Cl.$^5$ ............................................. B23K 9/167
[52] U.S. Cl. ...................................... 219/75; 219/136
[58] Field of Search ........................... 219/74, 75, 136

[56] References Cited

U.S. PATENT DOCUMENTS

| | | | |
|---|---|---|---|
| 2,856,510 | 10/1958 | Jones et al. | 219/74 |
| 2,902,587 | 9/1959 | Bernard | 219/74 |
| 3,125,666 | 3/1964 | Gorman et al. | 219/74 |
| 3,349,213 | 10/1967 | Gorman | 219/74 |
| 3,521,023 | 7/1970 | Dahlman et al. | 219/75 |
| 3,875,364 | 4/1975 | Boyett | 219/74 |
| 4,300,034 | 11/1981 | Schneider et al. | 219/75 |
| 4,567,343 | 1/1986 | Sullivan et al. | 219/74 |
| 4,599,505 | 7/1986 | Lukens et al. | 219/74 |
| 4,625,095 | 11/1986 | Das | 219/137 |
| 4,839,489 | 6/1989 | Dyer | 219/74 |

Primary Examiner—Clifford C. Shaw
Attorney, Agent, or Firm—Neuman, Williams, Anderson & Olson

[57] ABSTRACT

Apparatus for inert gas shielded arc welding having a plenum with an outlet covered by a gas lens. An electrode provides electric current to the part being welded. The gas lens can overlie the lip of the plenum to prevent ambient air from being drawn into the gas envelope and contaminating the weld. The plenum can be teardrop shaped, having sidewalls which converge toward the trailing end. To enable the torch to weld a circumferential surface which is confined by an overhang, the inert gas is introduced near the leading edge of the plenum by a U-shaped conduit which circumvents the overhang. The plenum is much wider than it is deep and the flow of inert gas for shielding can be turned generally perpendicular to the direction of its introduction. Finally, the inert gas introduced into the plenum can be directed at an electrode post within the plenum, and the lip introducing the inert gas into the plenum can have a trailing edge which projects further into the plenum than does its leading edge. These adaptations cause the stream of inert gas going into the plenum to be split by the electrode post, encouraging flow of inert gas into regions of the plenum obstructed by the electrode post.

44 Claims, 2 Drawing Sheets

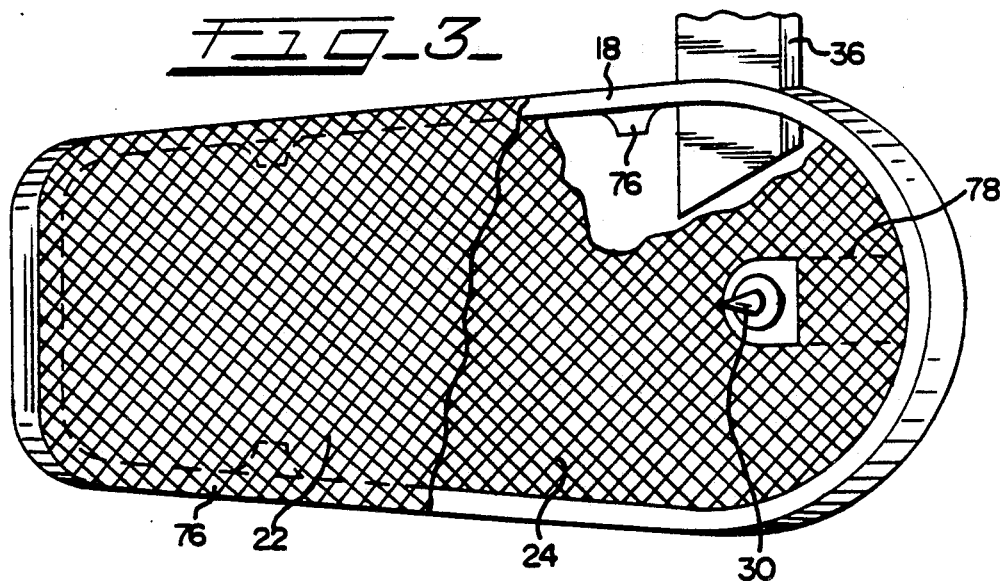
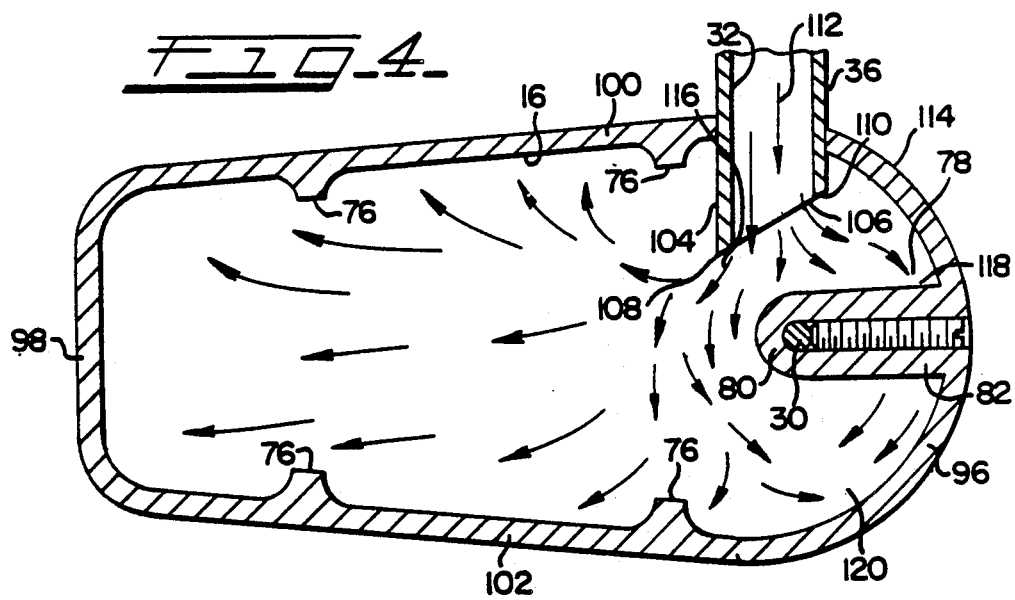
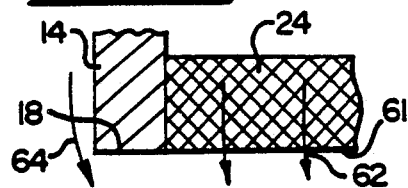
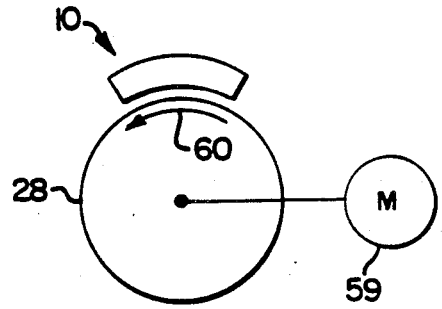
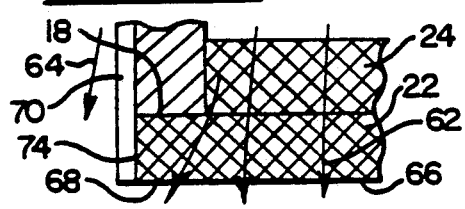

APPARATUS FOR INERT GAS SHIELDED ARC WELDING

TECHNICAL FIELD

This invention relates to welding apparatus which shields the site of the weld with an inert gas to prevent oxidation and other reactions with atmospheric gases. One particular type of welding facilitated by this apparatus is automatic gas tungsten arc welding.

BACKGROUND ART

Inert gas shielded arc welding is known, and several prior patents teach apparatus for carrying out such welding. For example U.S. Pat. No. 4,599,505 (Lukens et al.) shows a gas shield with a skirted inert gas head. The head has an elongated trailing end and an electrode receiving port which is offset toward the leading edge of the head. The inert gas conduit within the head is perforated on the side away from the lens and releases the inert gas through the perforations. The head is packed with metal wool to aid diffusion of the inert gas. The head is generally hemicylindrical. The Luken et al. patent was issued on Jul. 8, 1986.

Other patents which may be pertinent are U.S. Pat. Nos. 3,521,023 (Dahlman); 4,300,034 (Schneider); 4,567,343 (Sullivan); and 4,625,095 (Das).

A problem in the art has been how to use inert gas shielded arc welding to build up the metal on a workpiece, such as a jet engine turbine rotor, along a circumferential work surface which lies under a parallel overhang of the workpiece and thus is only accessible from the side. Commercially available automated welding systems have their torch heads and inert gas skirts rigidly mounted in line with a conduit through which inert gas is introduced to the workpiece. Such a torch must be advanced to a work surface perpendicularly and receive inert gas through a supply conduit disposed perpendicularly with respect to the workpiece. The overhang of a turbine rotor will not permit such a torch to advance to the circumferential work surface in the proper alignment for welding.

SUMMARY OF THE INVENTION

Accordingly, one object of my invention is an inert gas shielded torch which can work effectively when inserted in the confined space under an overhang of a workpiece.

A related object of my invention is an inert gas shield which can receive its supplies of inert gas, weld metal, and electricity from the side and still provide an adequate envelope of inert gas around the weld site.

An additional object of my invention is an inert gas shield comprising a plenum and a gas lens which are positioned to minimize the amount of ambient air drawn toward the weld site by the flow of inert gas through the gas lens.

Another object of my invention is inert gas shielded welding apparatus in which the inert gas shield is teardrop-shaped to provide a sufficient flow of gas to the trailing end for effective shielding even though the trailing end of the plenum is more remote from the source of inert gas than the leading end.

Another object of my invention is an inert gas shield which has a low profile to fit beneath an overhang which closely overlies the portion of the workpiece to be welded.

Still another object of my invention is an inert gas shield which has a single inert gas supply conduit, yet provides a substantially uniform flow of shield gas from all parts of its gas lens.

Still another object of my invention is a torch which combines the functions of a gas shield and an electrical contact for gas shielded arc welding, and which has the advantages mentioned above for the gas shield per se.

These and other objects of my invention will become apparent from the present drawings and specification.

In accordance with these objects, one aspect of my improved apparatus for inert gas shielded arc welding is a gas shield including a skirted plenum, an outlet defined by the skirt, means to admit a supply of inert gas into the plenum, and at least one gas lens which has its outer margin overlying the lip of the skirt. This construction prevents air surrounding the skirt from being entrained in the inert gas passed through the outlet.

A second aspect of the invention is apparatus of the type generally described above for welding a part which is moving from a leading position to a trailing position relative to the gas shield. This apparatus has a skirted plenum which is placed adjacent to the weld site. The plenum is teardrop-shaped, having a leading wall, a trailing wall, and opposed side walls which converge toward the trailing end. The inert gas is preferably introduced nearer to the leading end than to the trailing end of the plenum. This construction allows inert gas to be directed to the site of welding near the leading end, while maintaining an adequate flow of inert gas to the more remote trailing end of the plenum which shields the weld after welding is complete.

Still another aspect of the invention is inert gas shielding apparatus which is fed with a stream of inert gas initially traveling parallel to the gas lens and to the surface being welded. The plenum and gas lens of the gas shield redirect the inert gas so it flows perpendicularly to the surface being welded.

BRIEF DESCRIPTION OF DRAWINGS

FIG. 3 is a bottom plan view of the torch head, partially cut away to show the gas lens construction.

FIG. 4 is an isolated circumferential section of the torch according to the present invention, taken along line 4—4 of FIG. 1.

FIG. 5 is an enlarged fragmentary sectional detail view of an inert gas shield and gas lens assembly of the prior art.

FIG. 6 is a view like FIG. 5 of the corresponding structure according to the present invention.

FIG. 7 is a schematic view similar to FIG. 2, showing the drive means for the workpiece.

DETAILED DESCRIPTION OF THE INVENTION

While my invention will be described in connection with a preferred embodiment, it will be understood that I do not intend to limit the invention to that embodiment. On the contrary, I intend to cover all alternatives, modifications and equivalents within the spirit and scope of the invention as defined by the appended claims.

Figure 2:
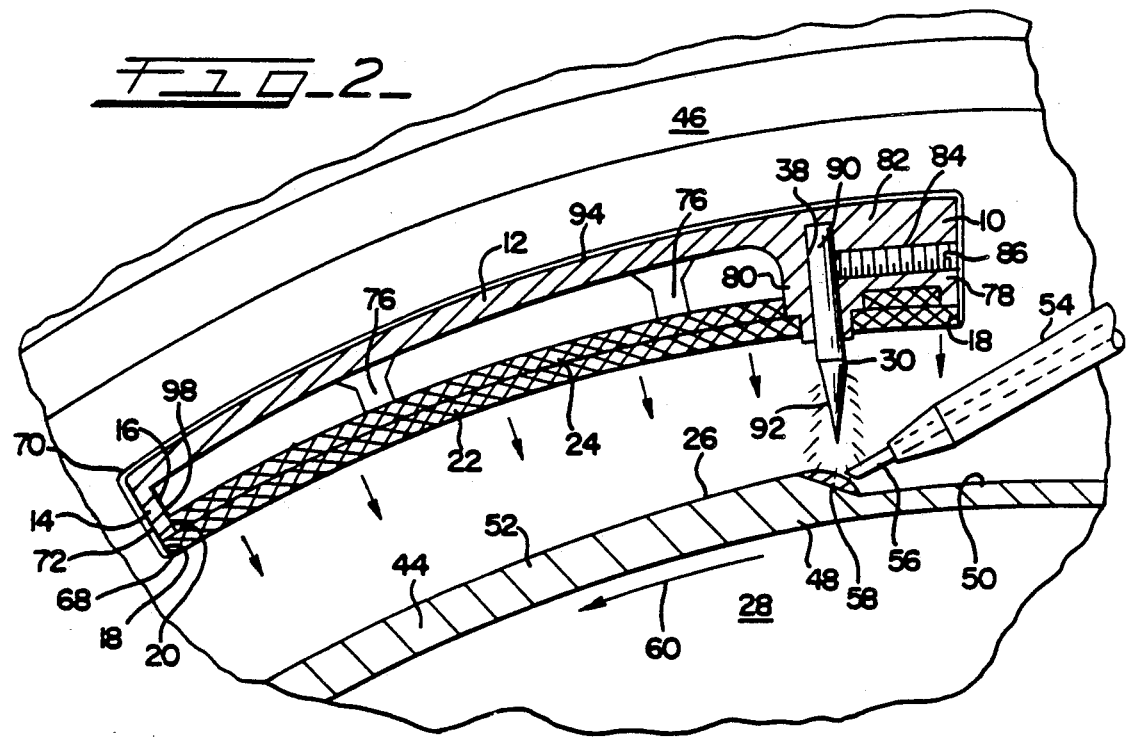
FIG. 2 is a sectional view taken along line 2—2 of FIG. 1, enlarged to show greater detail.

With reference primarily to FIG. 2, the torch generally indicated at 10 comprises a gas shield 12 including a peripheral skirt 14. The skirt 14 defines a plenum generally indicated at 16. The skirt 14 terminates in a lip 18 defining an outlet generally indicated at 20 which is covered by an outer gas lens 22 and an inner gas lens 24. Each gas lens is a fine wire mesh screen made of 300 Series stainless steel, and is about 1/16 inch (1.6 mm) thick. The gas lenses 22 and 24 collimate the inert gas to some degree so it passes through the outlet 20 substantially perpendicularly to the welded surface 26 of the workpiece 28. The gas lenses also tend to equalize the head of pressure in different regions of the plenum.

In a preferred aspect of the invention, a tungsten or other refractory metal electrode 30 is fixed with respect to, and projects through, the outlet 20 and gas lenses 22 and 24 to supply welding current to the welded surface 26. Alternatively, the electrode 30 can be separate apparatus. The plenum 16, gas lenses 22 and 24, and electrode 30 are sometimes referred to collectively herein as a torch head.

Figure 1:
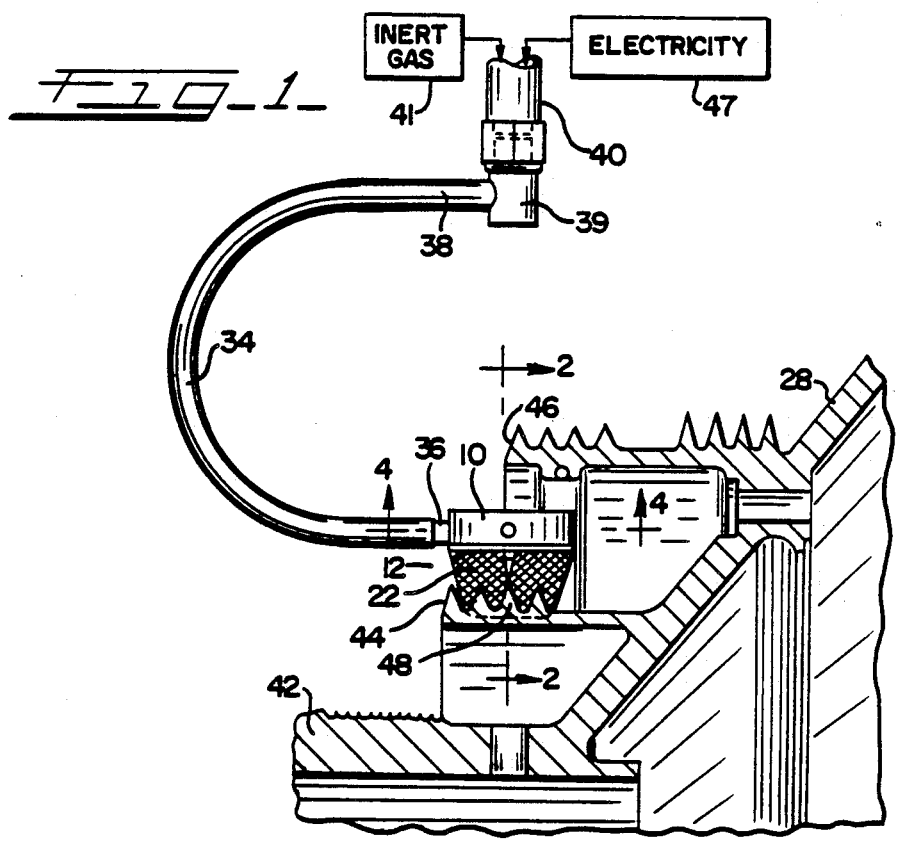
FIG. 1 is a side elevation of an inert gas welding torch according to the present invention, showing a portion of a turbine rotor as a workpiece which is being built up using the torch.

Inert gas is supplied to the plenum 16 by communicating means, here defined by a port 32, best seen in FIG. 4. Port 32 is supplied with inert gas by a gas supply conduit 34 having a first end 36 projecting into the plenum 16, a second end 38 which here is generally parallel to the first end 36, a junction 39, and an ultimate supply conduit 40 leading to an inert gas supply 41. (The conduits and junction are shown in FIG. 1.) Unlike the supply conduits of many torches of the prior art, the conduit 34 has a curved central portion, and here is U-shaped, to circumvent an axially extending overhang (flange 46). The conduit 34 introduces inert gas to the plenum 16 from the side and generally parallel to the lenses 22 and 24.

In this embodiment, electricity is also conducted from a supply 47 to the electrode 30 via the conduits and junction 34 through 40 and the gas shield 12, all of which are made of copper or other highly conductive material.

FIGS. 1 and 2 show a workpiece 28 which is being rebuilt using the torch 10 according to the present invention. The workpiece 28 is a precisely machined jet engine turbine rotor which comprises a series of overlapping circumferential, axially extending flanges such as 42, 44, and 46. Each flange, such as the flange 44, has knife edge seals or ribs such as 48. The seals become worn when the rotor is used in a jet engine. FIG. 2 shows a worn circumferential surface 50 of the knife edge seal 48 and a built up circumferential surface 52 of the seal 48 which has been restored to or beyond its original dimensions. A subsequent machining step may be necessary to obtain the precise original dimensions of the seal 48.

The additional metal needed to build up the surface 50 and form the surface 52 is provided by a conventional wire feed 54 which feeds a wire 56 of weld metal into a puddle 58 defining the weld site. The wire feed 54 is also adapted to circumvent the overhang 46. The current supplied by the electrode 30 melts the wire 56, forming the puddle 58, and the workpiece 28 is rotated about its axis of revolution with respect to the stationary torch 10 and wire feed 54 to move the worn surface 50 to be welded into the weld site 58 and withdraw the built up surface 52 from the weld site 58. Each portion of the workpiece to be welded thus passes from a leading position to a trailing position relative to the torch 10. The rate of feed of the wire 56, the rate of rotation of the workpiece 28, and other factors are controlled so that the built up surface 52 is a uniform, accurately circumferential surface which has, or can be machined to have, its original dimensions. In this embodiment the torch 10 is fixed and the workpiece 28 is rotated by an appropriate drive means 59 in the direction indicated by the arrow 60. This relationship is shown in FIGS. 2 and 7.

As suggested above, one difficulty in this rebuilding operation is the substantial axial overhang of the flange 46 over the flange 44. The overhang prevents a torch and gas shield which are rigidly fixed in line with a rigid conduit such as 40 from being presented radially to the knife edge seals such as 48, which are substantially beneath the flange 46. A second problem which complicates the welding operation is the small clearance between the flange 46 and the knife edge seals such as 48, which means that inert gas must be presented from one side of the weld site (from the left in FIG. 1) and turned 90 degrees within the plenum 16, and yet must provide substantially uniform inert gas coverage to substantially exclude the ambient atmosphere between the outlet 20 and the surfaces 50 and 52. The features of the present invention which address these problems will now be described in greater detail.

First, the construction of the gas lenses will be described.

The inner lens 24 is recessed within the skirt 14, as is true of the single gas lens in a prior torch. FIG. 5 shows the airflow pattern through and about a single lens 24 of the prior art which is entirely recessed within the skirt 14 so that the outer surface 60 of the lens 24 is flush with the lip 18 or even recessed within the lip 18. The parallel arrows such as 62 show the substantially laminar flow of inert gas through the lens 24, and the arrow 64 shows the flow of ambient air from outside the skirt 14 which is entrained in the flow of inert gas. Turbulence is created immediately beneath the lip 18, which has a substantial width as it is the shell of the gas shield 12. This turbulence causes the air 64 to mix with the inert gas 62 near the lip 18, thus reducing the effective width of gas shielding.

FIG. 6 illustrates the airflow pattern in accordance with this invention when a flush inner gas lens such as 24 is overlaid with an outer gas lens 22 having a central portion, generally indicated at 66, which is substantially coextensive with the gas lens 24, and a marginal portion 68. Since the marginal portion 68 overlies the lip 18, the inert gas which makes its way into the region below the lip 18 is collimated to some degree by passing through the lens 22. As a result of the present construction with an outer lens 22 overlying the lip 18, the same shielding can be provided by a narrower gas shield 12 which can be inserted and used in a confined space.

The lens 22 is retained in place by a thin epoxy dielectric coating 70 shown in FIG. 2 (actually much thinner than suggested by FIG. 2), which extends over the outer surface 72 of the skirt 14 and the outer edge 74 of the gas lens 22. The coating 70 also prevents arcing between the shield 12 and the workpiece 28. The inner gas lens 24 can be separate from the outer gas lens 22, or can alternately be integral with the gas lens 22 and machined around its edge to provide the marginal portion 68.

Referring to FIGS. 2 and 4, the inner lens 24 is supported in the gas shield 12 by the lugs 76 and the electrode support means 78 further described below. The lugs 76 are adapted to minimally interfere with the flow of inert gas within the plenum 16, and the electrode support 78 is mostly upstream of the weld site 58.

In this embodiment, the electrode support means 78 comprises a post 80 integrally formed with the gas shield 12, a reinforcing member 82 also integral with the gas shield 12, and a bore 84 in the reinforcing member 82 which receives a setscrew 86 accessible from outside the gas shield 12 to provide a mechanically secure abutment having negligible electrical resistance between the electrode socket 88 and the base portion 90 of the electrode 30. The opposite end 92 of the electrode 30 is referred to herein as a probe, and projects outside the gas outlet 20 and outer lens 22 so that the sole path of electric current from the torch 10 to the workpiece 28 will be via the probe 92.

Many alternate electrode support means 78 can be devised. For example, to avoid some of the obstruction of inert gas via the reinforcing member 82, the electrode socket 88 could be shifted upwardly into the outer surface 94, thus reducing or conceivably eliminating the post 80 protruding into the plenum 16. In such an alternate embodiment, however, the base portion 90 of the electrode 30 would function in the same manner as the post 80, to a lesser degree.

Next, the flow of inert gas through the plenum 16 will be described, again with reference to FIGS. 2 and 4. The plenum 16 comprises a leading wall 96, a trailing wall 98 ("leading" and "trailing" being defined with respect to the progress of welding as shown in FIG. 2), and first and second laterally spaced opposing side walls 100 and 102. Sometimes the walls 96–102 are referred to collectively as the side wall of the plenum 16. In this embodiment, the leading wall 96 is substantially an arc of a circle centered on the axis of the electrode 30 to provide a shield of approximately uniform diameter about the electrode 30. The side walls 100 and 102 converge toward the trailing wall 98 and together with the wall 98 define the trailing end of the gas shield 12. This tapered construction of the trailing part of the gas shield 12 tends to maintain the velocity of inert gas flowing within the plenum 16 toward the trailing end.

The electrode support means 78 is spaced from and between the side walls 100 and 102 and adjacent the leading wall 96 to provide minimal interference with the flow of inert gas along the path overlying the weld (between the electrode 30 and the center of the trailing wall 98). This construction also provides an inert gas shield of optimal width using a narrow plenum.

The conduit 34 projects through the wall 100 and directs a flow of inert gas generally laterally ("laterally" means up or down in FIG. 4) into the plenum 16. The point of introduction of inert gas is opposite the electrode 30 to provide a direct flow of inert gas immediately to the weld site 58. The inert gas is introduced substantially parallel to the gas lenses 22 and 24. This lateral introduction of inert gas means that the inert gas flow does not impinge directly on any part of the gas lenses 22 and 24, which would tend to create a localized excess of inert gas where it impinged and a deficit of inert gas near other parts of the outlet 20. The portion 104 of the conduit 34 projecting through the wall 100 here has a square cross-section, although it can also have a cross-section of another shape.

In this embodiment of the invention, the port 32 comprises a lip 106 having a trailing edge 108 and a leading edge 110, of which at least the trailing edge 108 projects into the plenum 16 and laterally beyond the leading edge 110. This biased lip 106 encourages the stream of inert gas generally indicated as 112 exiting from the lip 106 to be diverted toward the leading wall 96.

To divide the stream of inert gas 112 coming from the port 32 into leading and trailing streams 114 and 116, in this embodiment the stream 112 is directed at the electrode post 80. The leading stream 114 thus tends to follow the surface 118 of the reinforcing member 82. The trailing stream 116 is directed adjacent to the trailing side of the post 80. Just as was illustrated with FIGS. 5 and 6 in relation to the lip 18 of the plenum, the flow of the trailing stream 116 by the electrode post 80 tends to cause turbulence of the trailing stream 116 past the post 80. This turbulence directs inert gas into the region 120 shown in FIG. 4.

Portions of the gas lenses 22 and 24 lie on the leading side of the electrode 30. Although FIG. 4 does not show this, some inert gas effectively flows over the reinforcing member 82, which does not fill the entire space between the setscrew 86 and the lens 22.

Since the gas lenses 22 and 24 slightly resist the flow of the inert gas through the outlet 20, a slight head of static pressure is maintained within the plenum 16 which tends to evenly distribute the inert gas within the plenum, particularly toward the trailing wall 98 of the plenum. Also, the stream 116 is directed somewhat downstream in this embodiment of the invention. Finally, the tapered trailing end of the plenum 16 has a smaller flow cross-section, and thus provides a greater inert gas velocity in the trailing end, than an untapered plenum would provide.

Another feature of the invention is illustrated in FIG. 2. The lip 18, the gas lenses 22 and 24, and the gas shield 12 are curved to generally follow the surfaces 50 and 52. This feature provides a substantially uniform clearance between the lip 18 and a circumferential surface of the workpiece 28. The curvature of these elements of the torch 10 is important, with reference again to FIG. 2, because it would be difficult to fit the torch 10 between the flanges 44 and 46, while providing a uniform inert gas envelope, if the lip 18 and the lenses 22 and 24 were flat. Thus, this torch is suited to build up a circumferential surface having a particular radius, with little clearance between the surface and the torch.

What is claimed is:

1. Apparatus for inert gas shielded arc welding a workpiece having portions requiring welding, said apparatus comprising:
   a skirt defining a plenum and having a lip defining a gas outlet of said plenum;
   means adapted to communicate between an inert gas supply conduit and said plenum; and
   at least a first gas lens comprising a central portion covering said outlet and a marginal portion substantially coplanar with said central portion and overlying said lip.

2. The apparatus of claim 1, further comprising drive means to move at least one of the workpiece and said apparatus relative to the other, whereby the portions of the workpiece to be welded pass from a leading position to a trailing position relative to said apparatus.

3. The apparatus of claim 2, wherein said plenum comprises a leading wall and a trailing wall, and wherein said communicating means is adapted to introduce a stream of inert gas into said plenum generally parallel to said gas lens and nearer to said leading wall than to said trailing wall.

4. The apparatus of claim 3, wherein said communicating means is further adapted to direct the stream of inert gas generally laterally into said plenum.

5. The apparatus of claim 4, wherein said plenum further comprises first and second laterally spaced side walls and said apparatus further comprises electrode support means secured to and located at least partially within said plenum, between and spaced from said opposing walls, and adjacent to said leading wall.

6. The apparatus of claim 5, wherein said electrode support means comprises the base portion of an electrode which further comprises a probe portion extending through said gas outlet.

7. The apparatus of claim 5, wherein said communicating means is further adapted to direct the stream of inert gas toward said electrode support means.

8. The apparatus of claim 7, wherein said electrode support means is adapted to split the stream of inert gas into a leading stream diverted toward said leading wall and a trailing stream directed between said electrode support means and said trailing wall adjacent to said electrode support means.

9. The apparatus of claim 2, wherein said plenum is generally teardrop shaped and comprises a leading wall, a trailing wall, and first and second laterally spaced side walls which converge toward said trailing wall.

10. The apparatus of claim 9, wherein said communicating means is adapted to introduce a stream of inert gas into said plenum generally parallel to said gas lens and nearer to said leading wall than to said trailing wall.

11. The apparatus of claim 10, wherein said communicating means is further adapted to direct the stream of inert gas generally laterally into said plenum.

12. The apparatus of claim 11, further comprising electrode support means secured to and located at least partially within said plenum, located between and spaced from said side walls and adjacent to said leading wall.

13. The apparatus of claim 12, wherein said electrode support means comprises the base portion of an electrode which further comprises a probe portion extending through said gas outlet.

14. The apparatus of claim 12, wherein said communicating means is further adapted to direct the stream of inert gas toward said electrode support means.

15. The apparatus of claim 14, wherein said electrode support means is adapted to split a stream of inert gas directed from said communicating means into a leading stream diverted toward said leading wall and a trailing stream directed between said electrode support means and said trailing wall and adjacent to said electrode support means.

16. The apparatus of claim 1, further comprising an electrode having a base fixed with respect to said plenum and a probe extending through said outlet.

17. The apparatus of claim 1, further comprising a second gas lens disposed adjacent to said first gas lens and recessed at least partially within said skirt.

18. The apparatus of claim 1, wherein said skirt has an outer surface, said gas lens has an outer edge, and said apparatus further comprises a coating covering said outer surface and said outer edge.

19. The apparatus of claim 1, wherein said lip is shaped to provide substantially uniform clearance over the workpiece.

20. Apparatus for inert gas shielded arc welding a workpiece, said apparatus comprising:

drive means for moving elements of the workpiece which are to be welded from a leading position to a trailing position relative to said apparatus;

a skirt defining a generally teardrop shaped plenum, said plenum comprising a leading wall, a trailing wall, first and second laterally spaced opposing side walls which converge toward said trailing wall, and a lip defining a gas outlet of said plenum;

means for communicating between an inert gas supply conduit and said plenum; and at least a first gas lens covering said gas outlet.

21. The apparatus of claim 20, wherein said communicating means is adapted to introduce a stream of inert gas into said plenum generally parallel to said gas lens and nearer to said leading wall than to said trailing wall.

22. The apparatus of claim 21, wherein said communicating means is further adapted to direct the stream of inert gas generally laterally into said plenum.

23. The apparatus of claim 22, wherein said apparatus further comprises electrode support means secured to and located at least partially within said plenum, between and spaced from said opposing walls, and adjacent to said leading wall.

24. The apparatus of claim 23, wherein said electrode support means comprises the base portion of an electrode which further comprises a probe portion extending through said gas outlet.

25. The apparatus of claim 23, wherein said communicating means is further adapted to direct the stream of inert gas toward said electrode support means.

26. The apparatus of claim 25, wherein said electrode support means is adapted to split a stream of inert gas directed from said communicating means into a leading stream diverted toward said leading wall and a trailing stream directed between said electrode support means and said trailing wall adjacent to said electrode support means.

27. The apparatus of claim 20, further comprising an electrode having a base fixed with respect to said plenum and a probe extending through said outlet.

28. The apparatus of claim 20, further comprising a second gas lens disposed adjacent to said first gas lens and recessed at least partially within said skirt.

29. The apparatus of claim 20, wherein said skirt has an outer surface, said gas lens has an outer edge, and said apparatus further comprises a coating covering said outer surface and said outer edge.

30. The apparatus of claim 20, wherein said lip is shaped to provide substantially uniform clearance over a workpiece.

31. Apparatus for inert gas shielded arc welding comprising:

a skirt defining a plenum, said plenum having a leading wall, a trailing wall, first and second laterally spaced side walls, and a lip defining a gas outlet;

at least a first gas lens covering said gas outlet;

means for communicating between an inert gas supply conduit and said plenum through said first side wall, said communicating means being disposed to direct a stream of inert gas generally laterally into said plenum and generally parallel to said first lens when said communicating means is connected to an inert gas supply conduit.

32. The apparatus of claim 31, wherein said communicating means comprises a lip projecting through said first wall, said lip having a trailing edge and an opposed leading edge, said trailing edge projecting into said plenum and beyond said leading edge, thereby diverting a leading portion of the stream of inert gas away from a trailing portion of the stream of inert gas when said communicating means is connected to a supply of inert gas.

33. The apparatus of claim 31, wherein said communicating means is further adapted to introduce the stream of inert gas into said plenum nearer to said leading wall than to said trailing wall.

34. The apparatus of claim 33, further comprising electrode support means secured to and located at least partially within said plenum, located between and spaced from said opposing walls and adjacent to said leading wall.

35. The apparatus of claim 34, wherein said electrode support means comprises the base portion of an electrode which further comprises a probe portion extending through said gas outlet.

36. The apparatus of claim 34, wherein said communicating means is further adapted to direct the stream of inert gas toward said electrode support means when an inert gas supply conduit is connected to said communicating means.

37. The apparatus of claim 36, wherein said electrode support means is adapted to split a stream of inert gas directed from said communicating means into a leading stream diverted toward said leading wall and a trailing stream directed between said electrode support means and said trailing wall adjacent to said electrode support means.

38. The apparatus of claim 31, wherein said plenum is generally teardrop shaped and said opposing side walls converge toward said trailing wall.

39. The apparatus of claim 31, further comprising an electrode having a base fixed with respect to said plenum and a probe extending through said outlet.

40. The apparatus of claim 31, further comprising a second gas lens disposed adjacent to said first gas lens and recessed at least partially within said skirt.

41. The apparatus of claim 31, wherein said skirt has an outer surface, said gas lens has an outer edge, and said apparatus further comprises a coating covering said outer surface and said outer edge.

42. The apparatus of claim 31, wherein said lip is shaped to provide substantially uniform clearance over a workpiece.

43. Apparatus for inert gas shielded arc welding a work surface located under an overhang and accessible to supplies of an inert gas, electricity, and weld metal only from the side, said apparatus comprising:

a torch head sized to fit between the overhang and the work surface and comprising a plenum, a gas lens, and an electrode; said plenum having a side wall generally perpendicular to the work surface and a lip defining a gas outlet; said gas lens covering said gas outlet and disposed substantially parallel to the work surface; and said electrode comprising a base connected to said plenum for receiving electric current and a probe disposed between said gas lens and the work surface;

conduit means having a first end connected to an inert gas supply and source of electricity, a second end communicating through said side wall to conduct electricity to said plenum and to direct a stream of inert gas into said plenum generally parallel to said gas lens, and a curved portion between said ends for circumventing the overhang and supporting said torch head over the surface to be welded; and means for feeding weld metal to said work surface.

44. The apparatus of claim 43, wherein said conduit means is generally U-shaped and said first and second ends are substantially parallel.

* * * * *